United States Patent
Petersen et al.

[11] 3,728,627
[45] Apr. 17, 1973

[54] APPARATUS FOR SELECTING DIFFERENT GENERATOR OUTPUT RANGES IN ACCORDANCE WITH THE SPEED OF A MOTOR DRIVING THE GENERATOR

[75] Inventors: Hans-Gunther Petersen, 318 Wolfsburg; Heiko Requardt, 317 Gifhorn, both of Germany

[73] Assignee: Volkswagenwerk AKT, Wolfsburg, Germany

[22] Filed: Jan. 26, 1971

[21] Appl. No.: 109,900

[30] Foreign Application Priority Data

Jan. 30, 1970 Germany....................P 20 04 100.3

[52] U.S. Cl...................324/158 R, 324/161, 73/118
[51] Int. Cl..........................................G01r
[58] Field of Search....................324/15, 16, 158 R, 324/158 MG, 161, 133; 73/116–118; 328/116, 140

[56] References Cited

UNITED STATES PATENTS

| | | | |
|---|---|---|---|
| 3,215,935 | 11/1965 | Mead | 324/158 MG |
| 3,588,680 | 6/1971 | Athey | 73/117.3 |

*Primary Examiner*—Michael J. Lynch
*Attorney*—Watson, Cole, Grindle & Watson

[57] ABSTRACT

Apparatus comprising a plurality of voltage discriminator circuits selects different amplitude ranges of the electrical output of a generator in accordance with the rotational speed of the motor driving the generator. Each of the voltage discriminator circuits includes a first and a second voltage amplitude discriminator which are respectively actuated by an electrical signal representing the speed of said motor above and below a given amplitude. Each voltage discriminator circuit also includes gating circuitry for producing an output when one of the first and second amplitude discriminators is actuated so that each voltage discriminator circuit determines an electrical signal representative of a different rotational speed of the motor. The outputs of the plurality of voltage discriminators are fed to a common output terminal to trigger a recording apparatus.

5 Claims, 2 Drawing Figures

Fig. 1

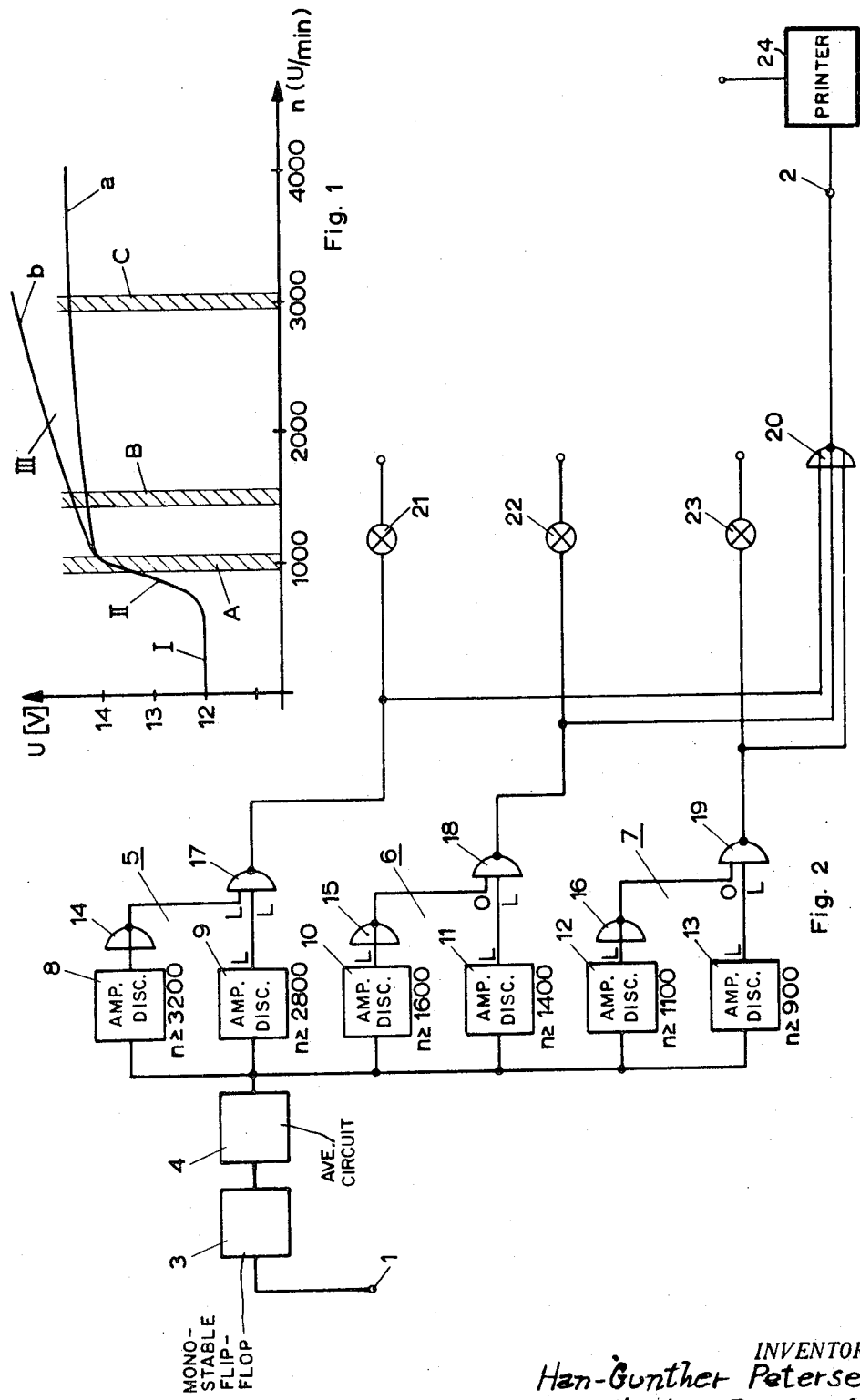

APPARATUS FOR SELECTING DIFFERENT GENERATOR OUTPUT RANGES IN ACCORDANCE WITH THE SPEED OF A MOTOR DRIVING THE GENERATOR

This invention relates to a system for the automatic determination of selected amplitudes of an electric value, represented by a characteristic curve and dependent on another electric value. In this invention, apparatus is provided for determining the engine r.p.m. of a motor vehicle from a voltage curve representative of the engine r.p.m.

For example, in apparatus for determining the operability of an electrical installation in a motor vehicle, there exists a need for an installation or system which will permit measured values to be obtained in a short time and as far as possible without interference with the installation itself, which measured values represent the engine r.p.m. as a characteristic voltage. Heretofore, the information was obtained in such a way that the corresponding voltage was measured at varying r.p.m. of the engine and which was read from a measuring instrument and by drawing the curve. This method has been proven to be time consuming and expensive.

It is therefore an object of the invention to provide for automatic determination of the characteristic curves characterized in that the engine r.p.m., is fed simultaneously to several voltage amplitude discriminators connected in parallel, each of which has been designed in such a way that only in the case of occurrence of voltage amplitude value lying within a specified amplitude range, which is peculiar to the characteristic curve, will generate triggering signals for an analyzer of the electric connected to the outlet. No triggering signals are generated from a given voltage discriminator if a voltage signal is not within its specified discriminators of the amplitude range. The analyzer may be a printer or an instrument for drawing characteristic curves.

Therefore, the invention is based, among other things, on the realization that it will suffice, in many cases, to determine only certain values of the electric entity and, to be sure, such values which lie along particularly significant areas of the characteristic curve.

Further objects of the invention will be apparent from the following description when considered in connection with the accompanying drawings.

FIG. 1 illustrates a voltage characteristic curve representative of the engine r.p.m. in a motor vehicle; and FIG. 2 shows an embodiment of a voltage discriminator circuit in accordance with the invention.

The characteristic curve showing the course of the voltage U is dependent on the engine r.p.m. $n$ in revolutions per minute and is divided essentially into three areas. Area I corresponds to only battery operation, that is to say the r.p.m. is still so low that the generator is practically not effective. In area II on the other hand, generator operation starts, and the generator operates in an unregulated manner. The regulating installation, on the other hand, becomes effective in area III, so that the voltage U is largely independent of the r.p.m. $n$. In this area the characteristic curve, assuming the regulator arrangement is in a proper condition, follows approximately the branch of the curve characterized by a, while in the case of a faulty operation of the regulator the branch of curve $b$ approximately indicates the relationship between the voltage and the engine r.p.m.

It turns out that for the determination of this characteristic curve, whose basic course is indeed known, it will be sufficient in the individual case to measure the amplitude values of the voltage U at three different values of the r.p.m. In this case one is dealing with r.p.m. values of the crank shaft of the engine within the three areas A, B and C, which are grouped in the case of this embodiment around the r.p.m. values in the order of magnitude of 1,000, 1,500 and 3,000 r.p.m. per minute. It is understood that all numerals given in FIG. 1 should be interpreted merely as examples.

The installation according to the invention applied to the characteristic curve shown in FIG. 1 is as shown in FIG. 2. There are three parallelly connected amplitude range discriminators which are fed an electrical value, as a rule a voltage, proportional to the r.p.m. $n$ of the engine and which are designed in such a way that, upon occurrence of voltages corresponding to the r.p.m. ranges A, B or C, they will release triggering signals for a connected analyzer of the voltage U.

As even this example shows, the characteristic curves are represented by an electrical value which has been connected from a nonelectrical value.

One embodiment of the invention is characterized in that the amplitude range discriminators are composed in each instance of two amplitude discriminators, one of which responds to amplitude values of the electrical entity lying above the upper border value of the pertinent amplitude range and the other responds to amplitude values lying above the lower value of the pertinent amplitude range. Connecting elements lying between the amplitude discriminators and their common outlet allow the triggering signals to reach the common output only when only one of the two amplitude discriminators in one of the discriminators has responded to the amplitude range assigned to it.

"Connecting elements" within the framework of the invention means gates and similar circuit elements known to those skilled in the art of circuit technology.

Indicators for the individual areas of the further electric entities may be connected to parts of the switching circuit and assigned individually to single discriminators of the amplitude range, that is to say in the alone mentioned example for the ranges of r.p.m. This will provide, for example, a visual indication of the r.p.m. range occurring in each instance.

FIG. 2 shows the essential parts of an embodiment of the invention. The assumption is made that the installation is to serve for the automatic determination of a voltage which is dependent on the engine r.p.m. of a motor vehicle as explained on the basis of FIG. 1.

The terminal 1 signifies the input of the installation whose output terminal has been designated by 2. Electrical signals are fed to the input terminal 1 which are proportional to the engine r.p.m. and which are conducted to the monostable flip-flop circuit 3 and to the circuit 4 for the formation of the arithmetic mean value. These installations per se are known.

The output of element 4 in this embodiment feeds three parallel connected amplitude range discriminators 5, 6 and 7, which are in each instance composed of two amplitude discriminators 8,9 10, 11; 12; 13. The various amplitude discriminators have been designed in such a way that they respond above varying threshold values and these threshold values are indicated as r.p.m. values n associated with the individual amplitude discriminators 8 to 13.

In each of the amplitude range discriminators an inverter 14 or 15 or 16 has been assigned to that amplitude discriminator which is designed for the higher threshold value, which inverter like all constructional elements used within the framework of the shown installation has a structure known per se. These inverters belong to the individual elements of a switch circuit, which furthermore contains for each amplitude range discriminator a Nand gate 17 or 18 or 19 and the nor gate 20 as a switching element common to all amplitude range indicators 5, 6 and 7. The output of the Nor gate 20 is identical to the output terminal 2 of the installation to which a registering instrument, for example a printer, has been connected. Outlet terminal 2 at the same time is connected with the control input of the registering instrument.

If it is assumed for example that a r.p.m. value occurs in the r.p.m. range designated by C in FIG. 1 in the vicinity of 3,000 r.p.m., then the amplitude discriminators 9 to 13 are actuated, while the threshold value of the amplitude discriminator 8 has not been reached. This case has been indicated in FIG. 2 by the designation "L" or "0". It can be seen that because of the method of operation of the inverters 14 to 16, signal "L" is at both inputs only in the case of the Nand gate 17, so that a trigger signal is released to output terminal 2 only by the amplitude range discriminator 5.

If the engine r.p.m. n lies between the three amplitude ranges, to which in each case an amplitude range discriminator has been assigned, then signal "L" at one input and signal "O" at the other input will not be fed to any of the Nand gates, so that there will be no trigger signal at the common output terminal 2.

The numerals 21, 22, and 23 designate signal lights for indicating the range of the r.p.m. for each discriminator. They have been connected to individual elements of the switching circuit.

The invention can always be applied advantageously when a constant characteristic curve is to be analyzed automatically.

We claim:

1. Apparatus for selecting a plurality of different amplitude ranges of the electrical output of a generator in accordance with the rotational speed of the motor driving said generator, comprising:
    a number of voltage discriminator circuits having as an input an electrical signal representing the speed of said motor;
    each of said voltage discriminator circuits including a first and a second voltage amplitude discriminator for determining an electrical signal representative of a given rotational speed, said first and second amplitude discriminators are respectively responsive to said electrical signal above and below a given amplitude of said electrical signal, gating means responsive to the output of said first and second amplitude discriminators for producing an output only with one of said first or second amplitude discriminators responsive to said electrical signal;
    the output of each one of said plurality of voltage discriminator circuits is fed to a common output terminal;
    means for recording the electrical output of said generator; and
    means for connecting said common output terminal to said means for recording to provide triggering signals thereto.

2. Apparatus as in claim 1 further comprising a number of indicators, each said indicator is responsive to a given one of said voltage discriminator circuit outputs for indicating the presence of an electrical signal within the speed range assigned to each voltage discriminator circuit.

3. Apparatus as in claim 1 further comprising means for averaging said electrical signal to said plurality of voltage discriminator circuits.

4. Apparatus as in claim 1 wherein one of said plurality of voltage discriminator circuits determines a speed range wherein the voltage output of said generator is below a threshold voltage and another of said plurality of voltage discriminators determines a speed range wherein the voltage generator output is unregulated.

5. Apparatus as in claim 4 wherein another of said voltage discriminator circuits determines a generator voltage wherein said generator voltage output is regulated.

* * * * *